H. RYDER.

Grates for Furnaces.

No. 6,259. Reissued Jan. 26, 1875.

Witnesses

S. N. Piper

J. R. Snow

Henry Ryder by his attorney.

R. H. Eddy

THE GRAPHIC CO. PHOTO-LITH. 39 & 41 PARK PLACE, N.Y.

UNITED STATES PATENT OFFICE.

HENRY RYDER, OF SOMERVILLE, ASSIGNOR, BY MESNE ASSIGNMENTS, TO JAS. J. WALWORTH, TRUSTEE, OF NEWTON, MASSACHUSETTS.

IMPROVEMENT IN GRATES FOR FURNACES.

Specification forming part of Letters Patent No. 136,673, dated March 11, 1873; reissue No. 6,259, dated January 26, 1875; application filed September 18, 1874.

*To all whom it may concern:*

Be it known that I, HENRY RYDER, of Somerville, of the county of Middlesex and State of Massachusetts, have invented a new and useful Improvement in Furnaces, or the grates thereof; and do hereby declare the same to be fully described in the following specification and represented in the accompanying drawings, of which—

Figure 1:
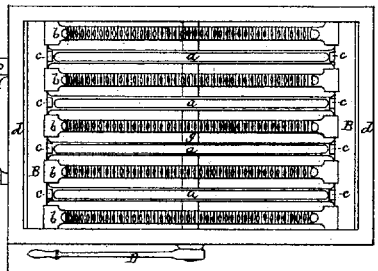
Figure 2:
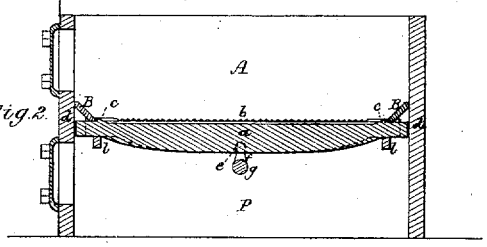
Figure 4:
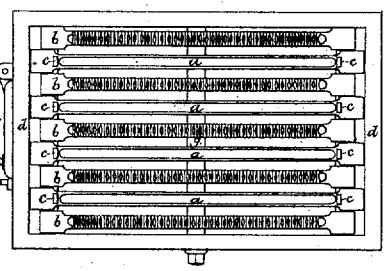
Figure 5:
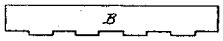
Figure 3:
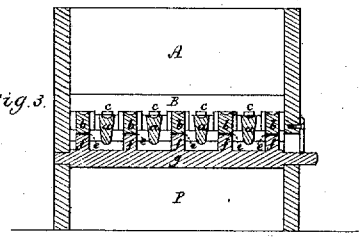

Figure 1 is a top view, Fig. 2 a longitudinal section, and Fig. 3 a transverse section, of a furnace containing my invention. Fig. 4 is a top view of the furnace and the grate-bars without the inclined guards. Fig. 5 is a top view of one of the said guards.

My invention consists in the grate provided with two series or sets of grate-bars, with those of one set arranged with their upper edges extended somewhat above those of the bars of the other set, such being substantially as and for the purpose hereinafter specified. My invention further consists of a combination of the inclined guards, two series of grate-bars, and mechanism for moving the bars of one series rectilinearly back and forth between those of the other, the said guards being arranged to project from the ends of the furnace, and lap over the bars of both series, arranged to alternate with each other in manner as described and represented.

In such drawings, A denotes a common furnace or steam-boiler fire-place, having its grate composed of a series, *b b b*, of movable and shorter bars, all arranged horizontally and in manner with respect to each other, and an ash-pit, P, as shown, the movable bars being notched on their upper surfaces. Each of the longer bars, however, is not quite so long as the distance between the end walls of the furnace, the same] being so as to allow of the proper expansion of the bar lengthwise under the heat to which it may be subjected.

Bars of other furnaces have been so made, but at their ends they have been left uncovered. When this has been the case, cinders, coal, or ashes have usually become packed, or have gathered between the ends of the bars and the next adjacent walls, and acted to prevent the bars from expanding, causing them, under the operation of the heat tending to expand them, to become curved, sprung out of shape, or broken. Such derangement or breakage of a grate-bar will be prevented by the inclined guard-plates B B, which rest on the several grate-bars, and against shoulders or abutments C C C, projecting up from some of them, and also against the ends *d d* of the furnace A. The plates B B, being inclined with respect to the grate-bars, in manner as represented, and simply resting against the ends of the furnace, move with the grate-bars as they may expand or contract lengthwise. The plates thus cover the spaces next the ends of the bars, and prevent them from becoming choked by the ashes, cinders, or fuel, thereby enabling the grate-bars to expand without danger of being estopped, so as to be bent or broken by the force operating to expand them.

The shorter bars *b* are free to move lengthwise on their supporting-shelves *l l*, each of said bars being notched at its middle, as shown at *e*, to receive one of a series of arms, *f*, projecting upward from a rocker-shaft, *g*, arranged across the ash-pit P, and going through one side wall of the furnace, and provided with a lever or arm, D, all as shown.

By taking hold of the arm D, and working it up and down, reciprocating rectilinear motion will be imparted to the movable grate-bars *b*, whereby the ashes will be caused to fall from the grate, and between its bars, and into the ash-pit.

The movable bars are raised or extend a little above the stationary ones, so as to be sure to effect a proper distribution of the coal or fuel.

I claim—

1. In the grate provided with two series of grate-bars, *a b*, the bars of one set arranged with their upper edges extended somewhat above those of the bars of the other set, such being substantially as and for the purpose specified.

2. In combination with the two series of grate-bars, *a b*, arranged as set forth, and provided with mechanism for moving those of one series rectilinearly, as described, the guards B B, applied to the bars and furnace substantially in manner and to operate therewith as specified, they being inclined downward and resting against the walls of the furnace and shoulders on the supporting grate-bars, so as to move with the said bars during their expansion or contraction, all as set forth.

HENRY RYDER.

Witnesses:
R. H. EDDY,
J. R. SNOW.